United States Patent [19]

Stearns et al.

[11] Patent Number: 5,045,202
[45] Date of Patent: Sep. 3, 1991

[54] CENTRIFUGAL OXYGENATOR FOR TREATMENT OF WASTE WATER AND SYSTEM

[76] Inventors: Donald M. Stearns, 7430 N. Cocoa Blvd., Cocoa, Fla. 32927; Walter D. Haentjens; Thomas Stirling, both of R.R. #1, Sugarloaf, Pa. 18249

[21] Appl. No.: 382,677

[22] PCT Filed: Nov. 18, 1986

[86] PCT No.: PCT/US86/02542
§ 371 Date: Apr. 13, 1987
§ 102(e) Date: Apr. 13, 1987

[51] Int. Cl.$^5$ .............................................. C02C 1/74
[52] U.S. Cl. .................................... 210/628; 210/758
[58] Field of Search .............................. 210/620-628, 210/758, 764, 765; 261/87

[56] References Cited

U.S. PATENT DOCUMENTS 3,948,492 4/1976 Hege ........................................ 261/87

Primary Examiner—Frank Sever
Attorney, Agent, or Firm—Malin, Haley, McHale, DiMaggio & Crosby

[57] ABSTRACT

Apparatus and system for increasing the efficiency of absorption of oxygen by biodegradable waste and particle break-up thereof, by introducing waste and gas, which may be air, into a collector under a highly agitated state, and agitating the air and waste under pressure in the collector by the impeller of a centrifugal pump as back pressure is provided in the collector. The collector is mismatched relative to the impeller to increase the retention and mixing time of the air and waste in the collector. The collector within the impeller forms a pump designed to operate close to its shut-off condition for increased retention time in the collector.

1 Claim, 6 Drawing Sheets

CENTRIFUGAL OXYGENATOR FOR TREATMENT OF WASTE WATER AND SYSTEM

BACKGROUND OF THE INVENTION

The treatment of waste water such as sewage or other biodegradable materials under pressure by air or oxygen is known to the art.

Such treatment has been done in a pressurized state as disclosed in U.S. Pat. No. 3,477,581, which issued to Donald M. Stearns, a co-inventor of the present application, on Nov. 11, 1969.

While the process of U.S. Pat. No. 3,477,581 is an advance in the treatment of sewage and other waste water, it requires one or more relatively large pressurized tanks and is not well suited to individual treatment systems, or to systems for small communities which may otherwise use septic tanks and the like.

The pressurization of the waste water as disclosed in U.S. Pat. No. 3,477,581 will increase the absorption rate of the oxygen used, but still is a relatively complex and cumbersome way to absorb oxygen by the sewage, and requires a large volume closed tank and is considered a batch process.

It has been established that the absorption of oxygen is an exponential function of pressure with the exponent greater than 1.0. This relationship is a partial basis for this application.

SUMMARY OF THE INVENTION

The present invention provides a novel diffusion means that provides surface contact between the gas phase and the liquid phase in the mixture of wastewater and air or Oxygen enriched gas comparable to the surface contact normally provided by the use of aeration tanks having a liquid height of 14–18 feet. This same novel diffusion means provides the ability to operate efficiently in liquid levels as low as 3 feet and the ability to operate at variable liquid heights of from 3 feet to in excess of 100 feet. This two stage novel diffusion means overcomes the effect of pressure normally generated by the height of the liquid column by using individually, or in series, a centrifugal first stage submersible mechanical diffuser consisting of an enclosed chamber with a wastewater inlet, a gas inlet, and a discharge into the second stage pressurized static diffuser. The design of the second stage diffuser is based on the requirement of sufficient resistance to hydraulic flow that will produce a backpressure that will provide suitable pressure ranges of from 5–30 PSI in the enclosed chamber of the centrifugal diffuser with the selection of the definitive operating pressure based on the application requirements. The mechanical design of the centrifugal first stage mechanical diffuser is attached with this application for information only, as a separate mechanical United States Patent application is being applied for. The diffusion means of the claimed invention can be readily adapted for aeration requirements in gravity collection system manholes, wetwells of pumping stations, and force main transmission pipelines as the physical size is comparable to that of a standard submersible recessed impeller wastewater hydraulic pump.

It is the object of this invention to provide a diffusion means coupled with a pump that will provide for the necessary mixing of the gas in any type of wastewater stream without consideration for the liquid height requirements that will maintain the level of dissolved Oxygen sufficiently to inhibit anaerobic digestion of waste products and also provide pretreatment of the waste products in order to reduce the loading of wastewater treatment plants and thereby increase their capacity.

It is another objective of this invention to provide a combination diffusion and mixing means that will provide efficient Oxygen transfer at wastewater levels as low as 3 feet and will be able to continue to provide efficient Oxygen transfer at any variable level of wastewater between 3 feet and 100 feet. This will allow a new means of operation of wastewater treatment plant system at variable liquid levels in place of the almost constant levels of operation in current plants. This ability will in turn greatly increase the capacity of existing and future wastewater treatment facilities.

It is still another objective of this invention to eliminate the problems of odor, corrosion, and explosion hazard in wastewater collection, transmission, and treatment systems; by the elimination of anaerobic digestion.

It is yet another objective of this invention to provide an efficient diffusion mixing means that can be made sufficiently small to be adaptable to installation in existing wastewater collection, transmission, and treatment systems with only minor modifications being required.

The above, along with other objectives and advantages of the method and apparatus of this invention, will become apparent from the following more detailed description when taken in conjunction with the accompanying drawings and illustrative embodiments.

DESCRIPTION OF THE PREFERRED EMBODIMENTS

Figure 1:
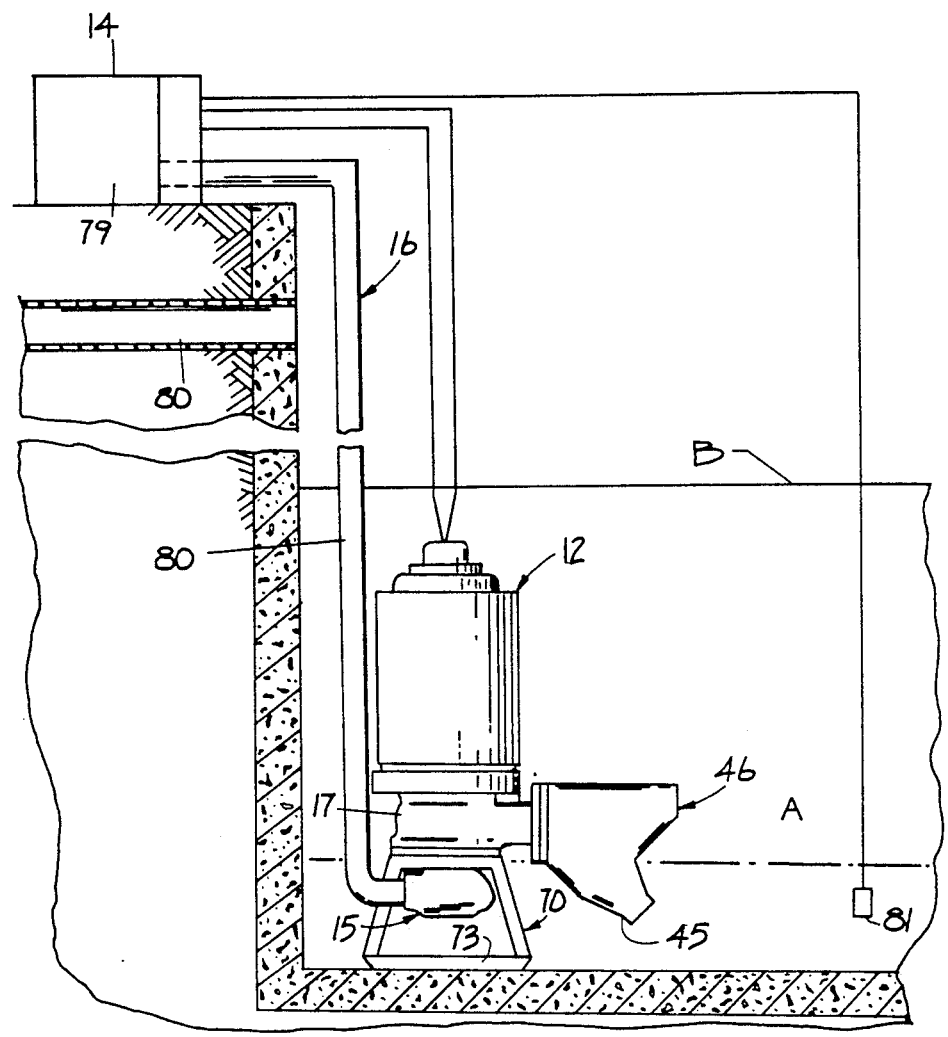
FIG. 1 is an elevational view of a form of sewage treatment device located in a tank for treating sewage on the principles of the present invention.

In FIG. 1 of the drawings, we have generally shown a type of vessel which may form part of a sewage treatment plant in which the invention may be embodied.

Figure 2:
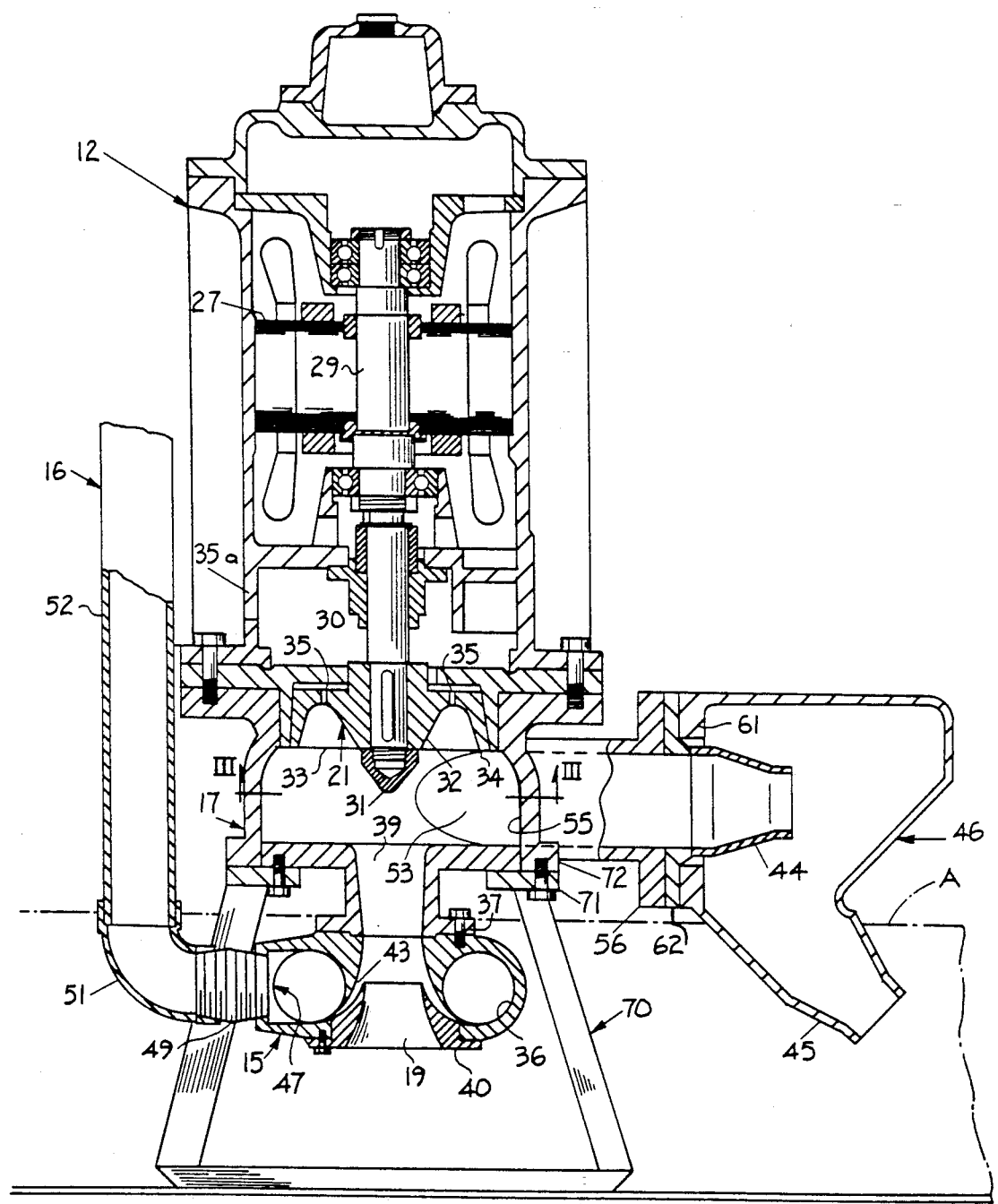
FIG. 2 is a cross-sectional view taken through the motor impeller, collector and inlet to the collector, and also showing series back pressure from the collector in section.

The plant may include a tank 10 which may be a conventional tank similar to the tanks conventionally used in biodegradable sewage treatment systems, and having an oxygenator 12 like that illustrated in FIG. 2 of the drawings therein. A source of oxiding gas, which may be air generally indicated by the reference numeral 14, including the controls therefor, may be located above the top of the tank and may have connection with an inlet fitting 15 shown in FIG. 2 as being an annular inlet fitting, but which may be a series of irregular apertures or holes.

The submergence of the oxygenator may be minimal and the minimum water level may be at level A indicated by broken lines in FIGS. 1 and 2 and just below the inlet to a collector 17.

Level B, which is in the order of six feet above the bottom of the tank, is a normal level. The water and sewage, however, should not exceed thirty feet, it being understood that the maximum submergence is governed by the design of a venturi inlet for gas and the throat of a suction head for the material being treated.

The inlet 15 includes an annular throat of a venturi-like inlet opening, encircling an inlet opening 19 for sewage or other biodegradable waste material. At low fluid levels, the induction of air through the throat of the venturi is because of the reduced pressure in the throat, which occurs in accordance with Bernoulli's theorem. The velocity head ($V^2/2\ g$) must, however, exceed the submergence in order for air to be induced into the inlet. Since the installation is designed so there need not be a great submergence of the oxygenator, the velocity head of the air need only be sufficient to overcome this submergence.

The oxygenator 12 is primarily a mismatched centrifugal pump with vortex impeller in which the collector is mismatched relative to the impeller. The pump itself may be of a type manufactured by Barrett-Haentjens Company and the form shown is similar to the Barrett-Haentjens type VNR Recessed Impeller Pump in which the pumping chamber is matched relative to the impeller. Other pumps, however, may be used.

As a general rule, the collector cross-sectional area is at least 20% larger than normally required for the particular impeller. This mismatch is reflected in the fact that the pump discharges at a rate between 15% and 60% of its most efficient flow rate.

Air or other gas containing oxygen is aspirated into the collector 17 through the inlet 15 because of the reduced pressure in the throat of the annular venturi. While the velocity head ($V^2/2\ g$) of air must exceed the submergence of the inlet in the water, with a minimum water level, the velocity head need only be sufficient to overcome the submergence. Where air or oxygen is forced into the inlet surrounding the sewage inlet, then the submergence limitation is not necessary.

The casing or collector 17 is excessively large relative to conventional pump casings and the inlets and outlets interact to create a back pressure in the casing.

The aspiration created at the inlet and the pressure within the casing results in a rapid absorption rate of oxygen by the biodegradable waste, as will hereinafter more clearly appear as this specification proceeds.

Referring now in particular to the general structure of the oxygenator, the pump is shown in FIG. 2 as a vertical axis pump directly driven from a motor 27, of a type which will efficiently operate when submerged in water. The motor has a shaft 29 suitably journalled in the housing for said motor and extending through a wearplate 30 into the upper portion of the collector 17. The vortex type impeller 21 may be keyed or otherwise secured to the lower end of the shaft 29, and held to said shaft by a nut 31 threaded thereon and engaging a hub 32 of said impeller.

Figure 3:
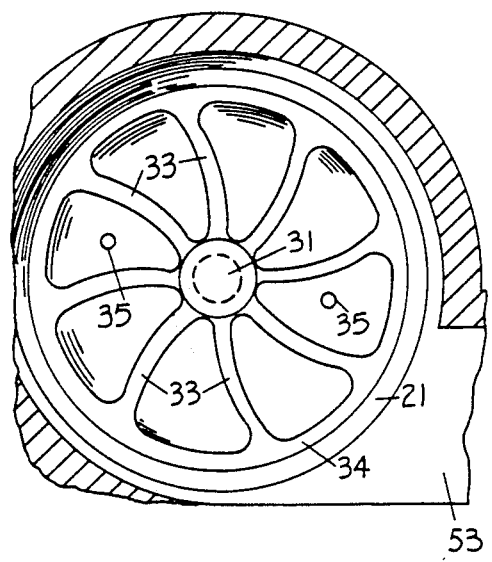
FIG. 3 is a fragmentary sectional view taken substantially along line III—III of FIG. 1.

As shown in FIGS. 2 and 3, the impeller 21 has a peripheral rim 34 and is recessed inwardly or upwardly relative to said rim, to provide space for blades 33 extending from the hub 31 to said rim and shown in FIG. 2 as being integral with said hub and rim. Clearance is provided between the back of the impeller and also between said rim and an annular extension from the wearplate 30 and between an upward extension of the hub 32 and the wearplate to avoid the necessity of lubricating the impeller and to avoid binding. Air relief holes 35 lead from the bases of certain impeller vanes 33 to prevent air binding of the impeller, the relief holes 35 communicating to the atmosphere through openings 35a in the housing.

As previously mentioned, the inlet 15 into the collector may be an annular inlet fitting 36 secured to and depending from a flange 37 of an inlet fitting 39 for biodegradable waste. Air or oxygen thus is mixed as admitted into the interior of the collector 17 along an axis coaxial with the enter of rotation of the impeller 21. The exterior wall 43 of the annular air inlet fitting 40 in cooperation with the exterior wall of the fitting 42 is shown as being of a venturi-like form and opens to the waste inlet passageway, and with one exterior wall of the fitting 40 forms a venturi-like inlet to the fitting 39 within and in axial alignment with the inlet 39 to the collector 17 and the vortex created by the impeller 21.

Figure 4:
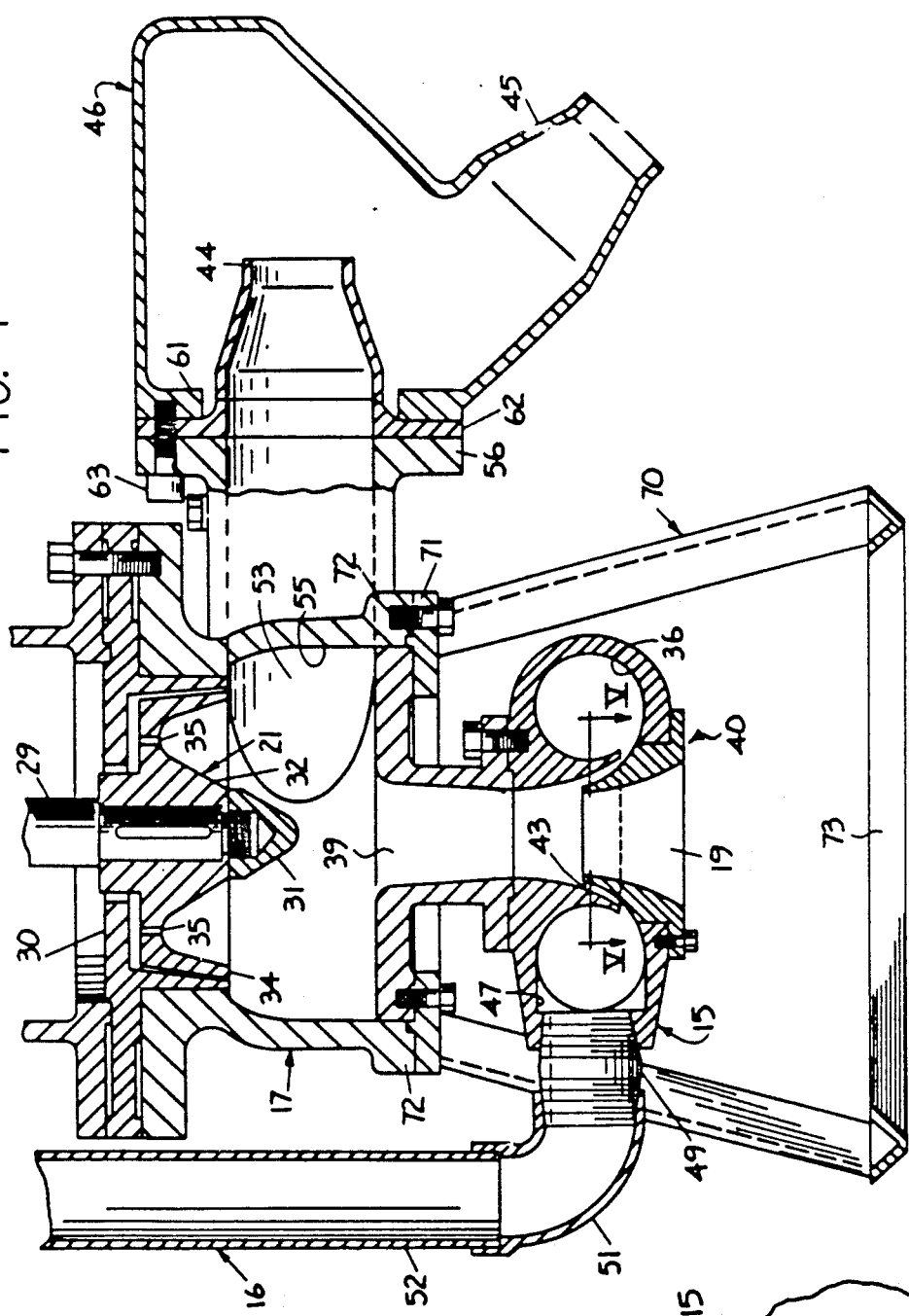
FIG. 4 is an enlarged sectional view showing the recessed impeller, the associated collector and inlet for oxidizing gas to the impeller, encircling the inlet through which sewage and oxidizing gas are drawn into the collector by the impeller.

As shown, in FIGS. 2 and 4, the inlet member 36 has an inlet port 47 leading thereinto, diametrically of the inlet axis of fluid into the collector 17. The port 47 has a coupler 49 threaded therein. The coupler 49 is threaded along each end. The opposite end of the said coupler from the port 47 is shown as having an elbow 51 threaded thereon and connected to an inlet pipe 52 for air or oxygen, which need or need not be under pressure, depending upon whether oxygen or air is being used.

Figure 5:
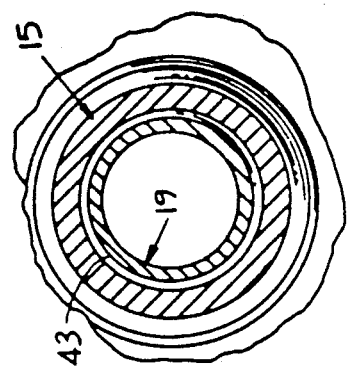
FIG. 5 is a transverse sectional view taken substantially alone V—V of FIG. 3.

FIG. 5 illustrates in cross section the concentric openings for air or oxygen into the inlet passageway 39 in alignment with the center of the vortex created by the impeller 21 and shown as leading downwardly from the bottom of the collector 17. The venturi-type of air or oxygen admission through the annular inlet passageway defined by the space between the annular inlet 15 and the inlet for biodegradable material, such as sewage, will achieve a maximum amount of oxygen absorption by the turbulence created by the vortex impeller 21 and the back pressure created by nozzles 44 and 45 in series.

Several nozzles are shown in series to achieve maximum particle size handling capacity and to take advantage of the additive pressure drop of each nozzle. This is particularly desirable for small units which are required to pass large sized solids. For very small units, it may be necessary to use three nozzles in series, whereas for large units a single nozzle may provide adequate back pressure and still provide an outlet diameter large enough to pass the maximum sized solid required.

Figure 6:
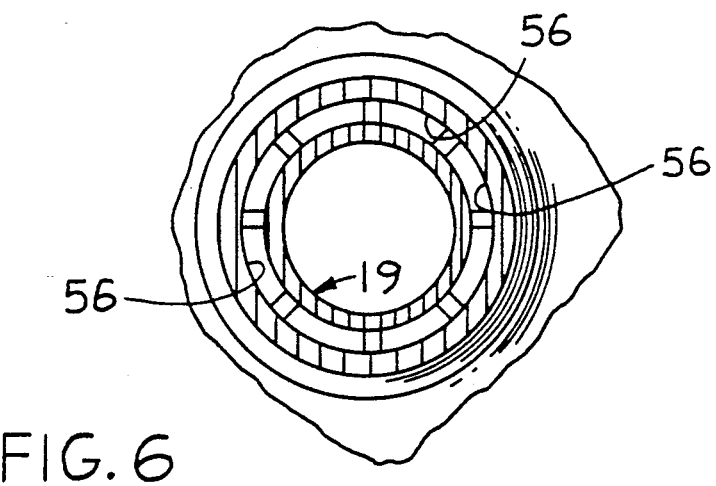
FIG. 6 is a sectional view similar to FIG. 5 but showing a modified form in which oxidizing gas and waste nozzles may be embodied.

It should be understood that the coaxial nozzles 19 and 15 need not form an annular converging slot but that a series of slots may instead be used to create a turbulence and mixing of air or oxygen with the biodegradable material entering the inlet passageway 39, into the collector 17 along an axis coaxial with the axis of rotation of the impeller 21. FIG. 6 illustrates annular slots 56 as an alternative form of nozzle opening for air or oxygen into the collector. The slots may be as shown in FIG. 6. It should be understood, however, that the length of the slots may vary, and the edges thereof may come together to form circular holes.

As previously mentioned, a maximum retention period for the air and biodegradable material in the collector is attained by mismatching the collector with respect to the impeller and by back pressuring the collector through the nozzles 44 and 45 or a nozzle box 46. An outlet passageway 53 leads from an internal wall 55 of the collector, and extends beyond the external wall of the collector 17. The outlet passageway 53 is flanged at its outer end, as indicated by reference numeral 55 and is shown in FIG. 4 as leading to the back pressure nozzle 44 shown as having a converging discharge end large enough to permit particle passage. The nozzles 44 and 45 are shown as having reduced discharge orifices and cooperate with each other to not only create a back pressure in the nozzle box 46 but to provide a maximum nozzle size for particle passage.

As shown in FIGS. 4 and 5, the nozzle box 46 has an internal annular flange 61 abutting an annular flange 62 of the nozzle 44. Cap screws 63 or other securing means may secure the flanges 56, 62 and 61 to the outlet from the collector. Suitable seals (not shown) may also be provided to seal the flange 62 to the flange 56 and the flange 61 to the flange 62 if desirable. Seals, however, should not be necessary where the flanges are properly seated and the cap screws 63 are drawn tight to tightly engage said flanges with each other.

Figure 7:
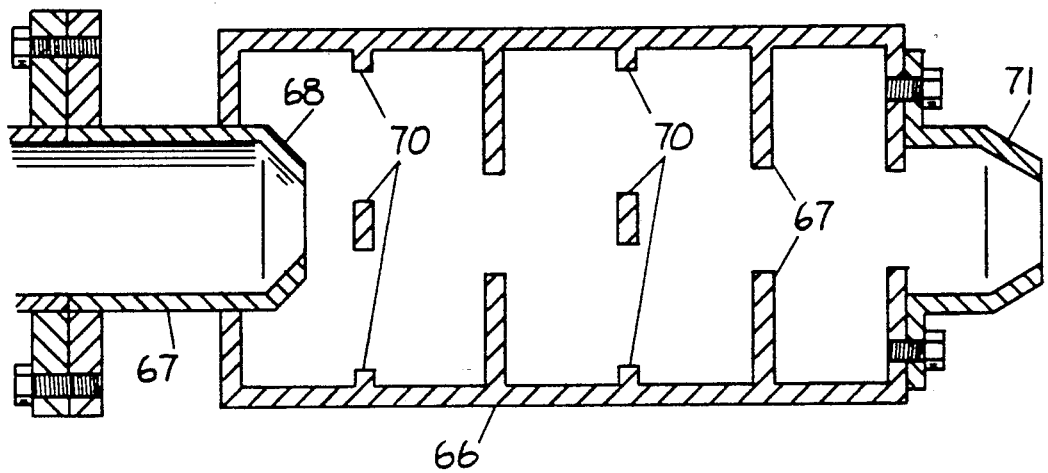
FIG. 7 is a vertical longitudinal sectional view of a modified form of back pressure creating outlet from the collector.

It should here be understood that while we have shown a back pressure or a pressure breakdown device in the form of a nozzle box 46 containing two converging nozzles in series, that any other type of pressure breakdown device may be substituted at the outlet of the collector. One such pressure breakdown device is shown in FIG. 7 in which an elongated enlarged diameter tank 66 may be connected to an outlet fitting 67, suitably secured to the collector 17 and is provided with internal baffles 69 and 70 spaced therealong, to cooperate with inlet and outlet nozzles 68 and 71 and the converging outlet ends thereof and create a back pressure in the collector and diffuse the pressure of effluent prior to discharge.

The oxygenator 12 shown in FIGS. 1, 2 and 4 is supported to extend vertically from a stand 70 formed by an annular ring 71 abutting an annular flange 72 of the collector 17. The ring 71 extends radially inwardly of the inner wall of the collector 17 and serves to secure the inlet fitting 19 in engagement with the inlet 39 to the collector and also to secure said ring to a flange 72 of the collector 17. The ring 71 is shown in FIGS. 3 and 4 as having legs flaring outwardly therefrom and secured at their bottoms to an open rectangular ground engaging base 73. The base 73 need not be rectangular but may be in the form of spaced ground engaging skids, although for stability, a rectangular base is preferred. It should be understood that the oxygenator need not be mounted on a base but may be secured to a wall of the treatment tank in which it is operating and may also be mounted on any other form of a base desired or required for a particular treating system.

FIG. 1, as previously mentioned, illustrates a simple form of device with which the invention may be carried out. The device may include an oxygenator 12, which may be similar to that shown and described in the description of FIGS. 2 to 7 of the drawings. In FIG. 1, broken line A indicates the minimum water level in which the oxygenator is effective. The water level, however, may submerge the oxygenator including the drive motor therefor, it being understood that the higher the water level, the greater the velocity head of air or oxygen required to overcome the submergence of the oxygenator. In most cases, the velocity head of the air or oxygen need only be great enough to overcome the submergence, and the system may be effectively carried out in this low water level.

79 indicates a source of air or oxygen under pressure. Where air is used, the source may be an air compressor controlled by suitable controls well known to those skilled in the art so not herein shown or described.

An inlet pipe 80 for biodegradable material is shown as leading into the tank 10.

Biodegradable material preferably enters the collector 17 of the oxygenator through a venturi-like nozzle, like the nozzle 19 and in direct alignment with the axis of rotation of the impeller 21. As previously described, the supply of oxygen or air is supplied by an annular nozzle extending about the outside of the biodegradable material inlet 19, to effect a circulation of the air and oxygen to the collector. This creates an agitation of the oxygen and biodegradable into the collector 17, to further be agitated for a longer period of time than possible with normal pumps, due to the mismatching of the collector with the impeller aided by the back pressure created by the nozzles 44 and 45 in series, and leading into and from said nozzle box 46.

With the foregoing arrangement of sewage and air or oxygen inlets leading to the collector 17, and the agitation created by the vortex of the impeller 31, as well as the back pressure created by the nozzle box 46 and the nozzles 45 and 46, a thorough mixing of oxygen or air with the sewage is attained in a far shorter time than has heretofore been considered possible. The result is that the effluent discharged from the nozzle box by reaction with the oxygen in the air will be at or close to the saturation level for its temperature and pressure. It may, in fact, be supersaturated with respect to the atmospheric pressure in the vessel. If so, oxygen is released until the normal saturation level is reached.

The raw sewage and effluent may, however, be recirculated through the oxygenator as air or oxygen is admitted to the oxygenator until the effluent is in such condition that it may be safely discharged from the tank 10 through a pipe 81 leading through the wall of the tank adjacent its bottom and under the control of a suitable valve (not shown), the operation of which may be controlled by a conventional form of oxygen concentration probe 81 indicating the absorption of oxygen into the material being treated or other type of process demand control and not described herein since the controls may be of any well known form. Thus, the oxygenator may be started or stopped according to predetermined levels of oxygen concentration or it may be operated continuously by introducing air or oxygen under controlled conditions to keep the oxygen concentration within a predetermined range.

With the oxygenator of the present invention, the rate of oxygen absorption is increased under pressure, not linearly but exponentially. The device also permits increased retention time on a continuous rather than on a batch basis, thus substantially improving the oxygenation efficiency.

Figure 8:
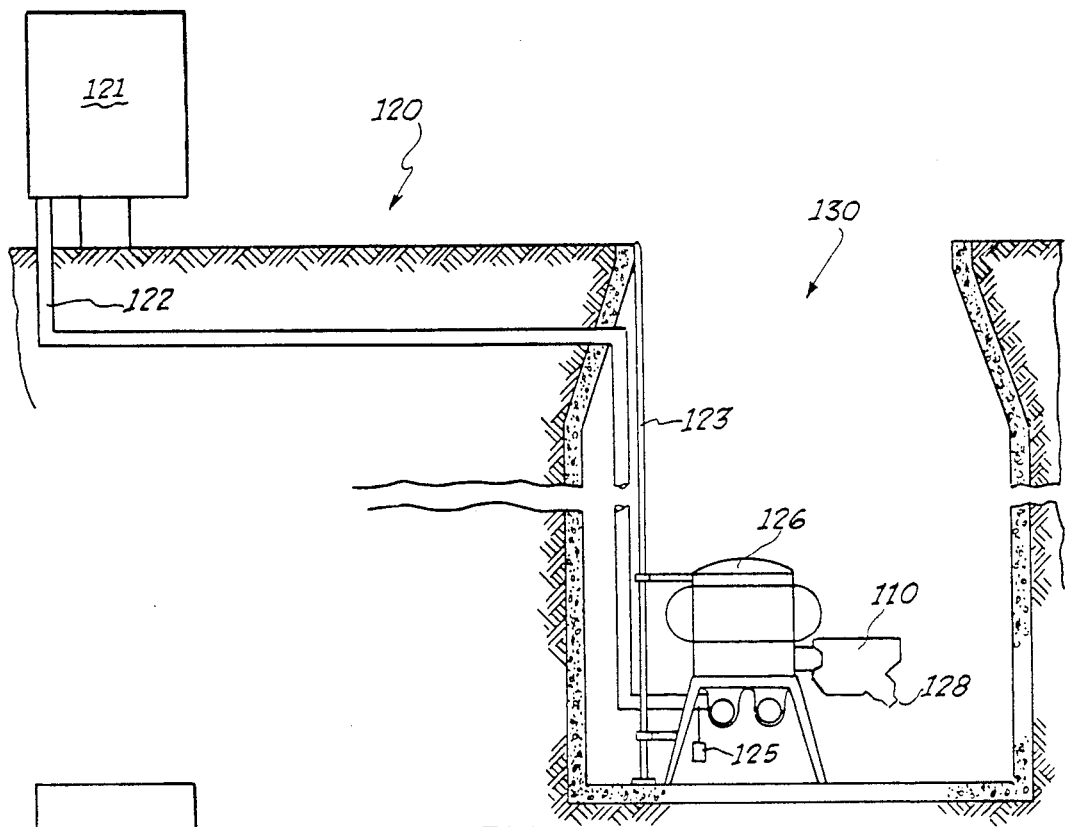
FIG. 8 is a cross-section of a diagrammatic illustration of the Centrifugal Oxygenator with a "Nozzle Box" located in a manhole of a gravity collection system.
Figure 9:
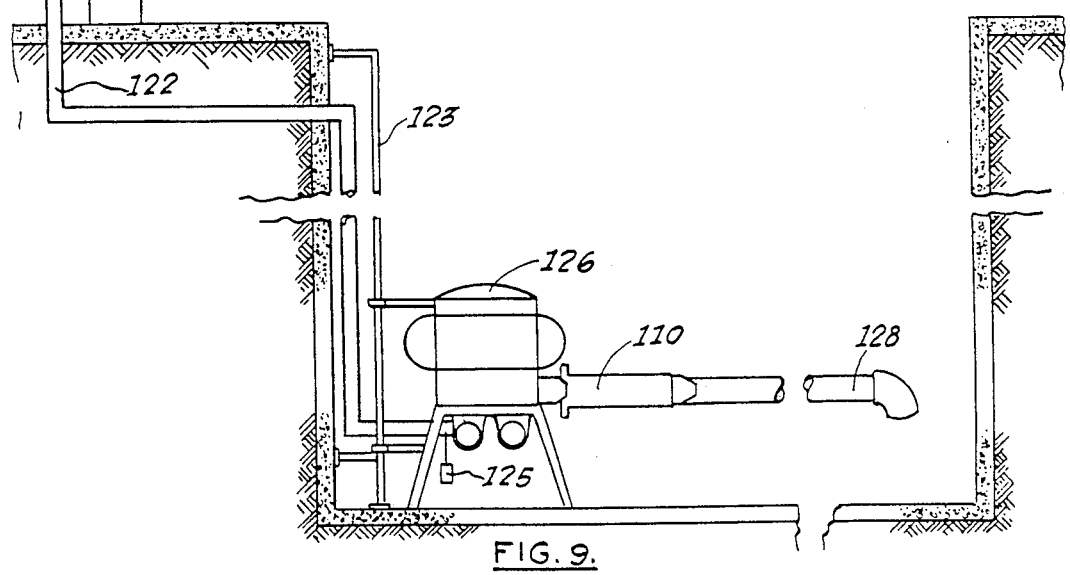
FIG. 9 is a cross-section of a diagrammatic illustration of the Centrifugal Oxygenator with either a secondary "Nozzle Box" or typical secondary static diffuser and backpressure device located in the wetwell of a wastewater pumping station of either the submersible pump or wetwell/drywell type.

FIGS. 8 and 9 provide the diagrammatic illustration of the Centrifugal Oxygenator with a nozzle box or a secondary static backpressure diffuser and is shown in combination with the balance of the components required for location in a manhole 130 or in a pump station wetwell 132. For low gas rate applications, only the nozzle box would be required. For high gas rate requirements, a secondary static backpressure diffuser, of suitable size and design, will be required. The Centrifugal Oxygenator System 120 includes a control panel 121, electric cables, gas tubing 133, control wiring assembly 122, a slide rail mounting 123, the Centrifugal Oxygenator 126, a diffuser means 110, and a recirculation distributor 128. The Centrifugal Oxygenator System 120 consists of a combination of electrical and gas flow control equipment mounted in a stainless steel cabinet for outdoor installation. The power required is a 230/460 volt supply to the control panel 121. For aspirated air or pressurized enriched Oxygen feed streams, the control panel will contain air flow control valves and flow meters. For compressed air systems, the control cabinet may also contain the air compressor with electric motor drive for small air requirements. The control panel 121 can be located up to 50 feet away from the manhole for pressurized gas feed systems, but needs to be within 10 feet for accurate aspirated air feed control. In aspirated air systems, if it is not possible to locate the control panel within the required 10 feet, an alternate feed and control system is available. In this case a submersible motor, used in the construction of the Centrifugal Oxygenator, can be provided with a double ended motor shaft arrangement with one end of the motor shaft connected to the impeller and the opposite end directly connected to a low pressure centrifugal air compressor which can be attached to the motor housing, or become an integral part of the motor housing. This low pressure centrifugal compressor would have a draft tube that would extend above the level of the high water in the manhole or sump. The capacity of the centrifugal compressor would be matched to the maximum gas handling capacity of the size of Centrifugal Oxygenator applied to the requirement. This would remove any limitation for the location of the control cabinet. The connection between the control panel 121 and the manhole 130 can consist of power cables, gas flow tubing, and control wires 122 to start and stop both the Centrifugal Oxygenator 126 and the gas feed 122 based on a signal from the dissolved Oxygen probe 125 located in the manhole 130. the dissolved Oxygen probe 125 needs only to respond to the absence or presence of dissolved Oxygen, although a more expensive probe that measures the quantity of dissolved Oxygen can be utilized. The Centrifugal Oxygenator assembly can be mounted either on a flat bottom section of the manhole or wetwell or can be mounted on a slide rail attached to the vertical side of the manhole or wetwell. The Centrifugal Oxygenator assembly includes the secondary diffuser 110 and the recirculating distributor 128 which are directly mounted to the discharge of the Centrifugal Oxygenator. This can allow for the removal of the assembly without personnel entering the manhole or wetwell.

Figure 10:
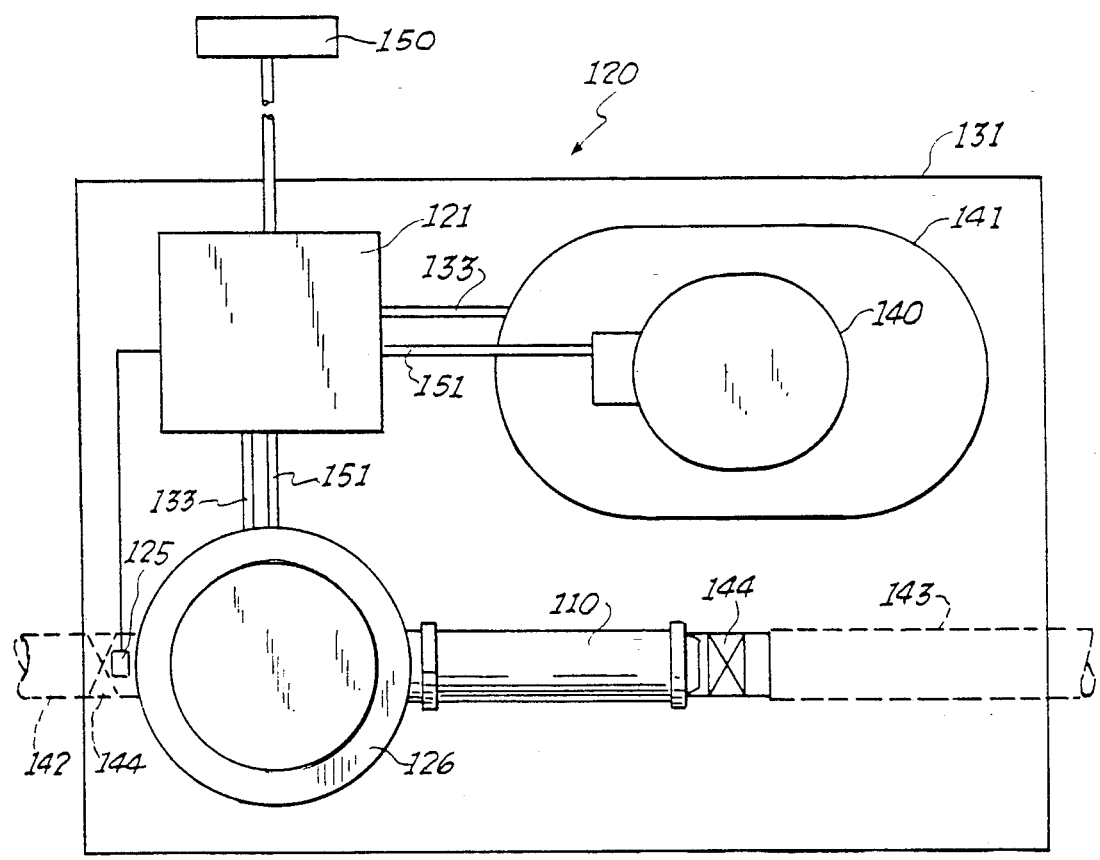
FIG. 10 is a diagrammatic top view illustration of a drypit Centrifugal Oxygenator with a secondary static backpressure diffuser installed in a pipeline system for use in wetwell/drywell pump stations, transmission pipeline aeration units, treatment plant equalization systems, or any other application requirements for pipeline aeration.

In FIG. 10, the diagrammatic illustration of a drypit Centrifugal Oxygenator with a secondary static backpressure diffuser installed in a wetwell/drywell pump station, transmission pipeline system at a pump booster station, or as a single component along a force main transmission system for the purpose of adding additional Oxygen concentration in long pipelines. This will, in turn, prevent anaerobic digestion during the extended exposure time of the wastewater in the pipeline. Other applications of this type of system that require non-submersible Centrifugal Oxygenators are wastewater treatment plan equalization systems, primary aeration systems and other requirements that have piping that encloses the wastewater. For the non-submersible applications, the vertical mounted Centrifugal Oxygenator assembly 120 can be completely factory built, skid mounted 131, complete with all required components including piping, valves, control panel 121 for motor starters and gas feed control equipment, electrical wiring 151, air compressor system 140, and storage tank 141, if required, so that the installation will only require a power supply 150, connection of a suction line 142 and a return line 143 into the piping system, and the placement of the dissolved Oxygen probe 125 in a suitable position. The secondary static backpressure diffuser 110 can be placed either at the discharge of the Centrifugal Oxygenator or in the pipeline system dependent upon the gas rates required. Due to the large difference in physical size of wetwell/drywell pump stations, BOD loading variations, and other factors effecting Oxygen requirements; different sizes and capacities of Centrifugal Oxygenators coupled with different sizes of secondary static backpressure diffusers are required.

In addition to the aeration requirement of the wetwell, the Centrifugal Oxygenator System can be installed in the pump station to provide dissolved Oxygen levels in the discharge pipeline of that pump station. For long pipeline systems and pipelines with long wastewater storage time, additional drywell type Centrifugal Oxygenator Systems can be placed at intervals along the pipeline so that replacement of the dissolved Oxygen used in the aerobic reduction process can be replaced; thus removing the hazards of anaerobic digestion. The pipeline systems would require a "side stream" flow, or in other words, a percentage of the total flow in the pipeline would be diverted into the Centrifugal Oxygenator System and then returned to the pipeline in a completely enclosed system. The returned portion of the "side stream" would be mixed with the total flow of the pipeline; thus restoring the dissolved Oxygen levels in the pipeline and removing the possible action of anaerobic digestion. Based on the Oxygen requirements, compressed air, Oxygen enriched gas, or pure Oxygen gas feed may be required. In wastewater treatment plants, there are a number of requirements for high efficiency Oxygen transfer at low liquid levels as well as on variable levels that can be solved by either the submersible or dry/wet Centrifugal Oxygenator Systems.

These applications include head box aeration, screening chamber sumps, grit removal systems, aeration and mixing in equalization tanks, primary aeration, secondary aeration, dissolved air floatation/separation systems, aerobic sludge digestion systems, secondary aeration systems for effluent, aeration systems for effluent storage tanks, and aeration of filtrate/centrate from solids concentration systems.

The Centrifugal Oxygenator Systems provide a high efficiency low cost means of conversion of all existing and newly constructed gravity collection systems, pump station wetwells, and force main transmission systems into wastewater pretreatment facilities and thus remove or greatly reduce the need for expensive upgrading, expansion, or construction of wastewater treatment plants. The Centrifugal Oxygenator systems will accelerate and enhance the operation of existing and future treatment plants by allowing the treatment process to start and continue throughout the collection systems, pump station wetwells, and force main transmission systems. It will also benefit in treatment plant operation in that it will maintain concentrations of Aerobic Bacteria in the incoming flow of wastewater to the treatment plant, which in turn, will prevent "slugs" of Anaerobic wastewater from entering the plant thereby putting excess Oxygen demands on the primary aeration system. Dependent on the overall retention time of the wastewater in the collection and transmission systems, this pretreatment by the Centrifugal Oxygenator Systems can increase plant capacities by 20 to 50 percent.

The pretreatment provides net added capacity to the treatment plant not only be reducing the organic loading, which in turn provides additional hydraulic loading, but also in the following ways. Pretreatment eliminates the need to supply high rates of Oxygen deficiencies. It also provides stabilized concentrations of dissolved Oxygen which in turn allow for maximum concentrations of Aerobic Bacteria which will provide for an increase in plant capacity by improving the treatment performance standards and eliminating the unpredictable, inconsistent, and unacceptable shock loadings to the aerobic treatment process.

Equally important benefits provided by the Centrifugal Oxygenator Systems are the elimination of the causes of odor problems, corrosive destruction, and explosion hazards throughout the entire collection, transmission, and treatment facilities of wastewater systems. This will reduce the high initial cost of construction, potential harm to people and property, and the high maintenance costs of necessary repair to piping, valves, pumps, motors, and other electrical equipment.

The Centrifugual Oxygenator Systems will provide substantial cost savings in the use of Oxygen in either an enriched form or a pure oxygen feed to wastewater plants. This cost saving is obtained by a more efficient use of the oxygen due to the accurate control system of feeding the gas through the Centrifugal Oxygenator, on-off operation of the gas feed system without fear of pluging, dispersion of the gas phase into the liquid phase under a contained pressurized condition, and the ultra-fine dispersion of the gas phase into the liquid phase by the Centrifugal Oxygenator in combination with secondary diffuser systems.

Based on the combination of the discharge hydraulic velocity of the mixture of liquid and gas phase and the introduction of the mixture at the lowest possible point in the aeration system, the Centrifugal Oxygenator provides great improvement in contact time of the gas phase which is necessary to rapidly replace the dissolved Oxygen in the liquid phase. As the solubility of Oxygen in water is very low, the actual oxygen transfer of the dissolved oxygen to the Aerobic bacteria is limited by the ability of the aeration system to resupply the dissolved oxygen from the entrained gas phase oxygen. The Centrifugal Oxygenator provides an ultra-fine gas dispersion, a complete mix of the gas dispersion in the liquid pumped by the unit, inducted velocity mixing of the discharge of the Centrifugal Oxygenator with the contents of the balance of the aeration tank, and provides for the discharge to be directed at the bottom of the aeration vessel. The combination of these factors, coupled with the ability to suspend organic solids from the bottom of the tank are all factors in obtaining high efficiency oxygen transfer rates and efficient cost utilization of expensive enriched oxygen or pure oxygen gas supplies.

Centrifugal Oxygenator Systems, by their ability to eliminate Anaerobic digestion in collection, transmission and treatment systems of wastewater facilities can remove the requirement of odor control equipment which uses dangerous and expensive chlorine gas or expensive ozone. By eliminating the costs of chemicals required, the high cost of equipment needed to apply the chemicals, the resultant safely systems needed, and the cost of labor required to monitor these dangerous systems, the Centrifugal Oxygenator Systems can provide savings in the operation of wastewater facilities that are estimated to exceed $50,000,000.00 per year in The United States alone.

Centrifugal Oxygenator Systems, by their ability to eliminate Anaerobic digestion in collection, transmission, and treatment systems of wastewater facilities can stop the uncontrolled generation of Hydrogen Sulfide gas, which in turn, forms a dilute solution of Sulphuric Acid when contacted by water or water vapor. This is the primary cause of extensive corrosion in pipeline, pump stations, and treatment facilities; wherever metal or electrical components exist.

Hydrogen Sulfide gas can enter all electrical components and, even with low humidity, form Sulphuric Acid, resulting in the accelerated destruction of this equipment. In The United States alone, the cost of labor and materials for replacement and maintenance costs due primarily to this accelerated destruction are estimated to exceed $100,000,000.00 per year.

Centrifugal Oxygenator Systems, by their ability to eliminate Anerobic digestion in collection, transmission, and treatment systems of wastewater facilities can remove explosion hazard problems which are a direct result of the uncontrolled generation of Methane gas in the wastewater systems. This oxygen deprived and/or explosive atmosphere creates an ever present danger to the people that must operate and maintain these systems as well as to people living in close proximity to the facilities. The extra costs required to protect against these dangers are estimated to cost over $25,000,000.00 per year in The United States alone.

Due to the surge loadings that occur in all wastewater treatment plants, hydraulic design factors must take into consideration that the capacity requirements be increased by as much as 250 percent above the average daily flow requirements to accommodate for this factor. As this surge loading occurs for an average time of six hours within a twenty four hour operational period, the capacity of treatment plants is effected and limited by the size of the aeration systems that must accept this surge loading. Under current design practices, the primary and secondary aeration systems operate at constant levels and therefore are unable to handle the peak flows that occur two or three times per day. With the design of the Centrifugal Oxygenator Systems being such that they can operate efficiently at minimum levels of as low as 3 feet and at any variable level up to 100 feet, a complete new concept both in design and operation of wastewater treatment plants are available. By the use of pump-down during the low flow periods of inflow to the treatment plant, the capacity of the plant can be greatly increased by the use of the Centrifugal Oxygenator System in the primary and secondary aeration units of the treatment plant. The claim of this invention is the ability of the Centrifugal Oxygenator Systems to increase the capacity of existing and future treatment plants by 25-100 percent with only a change in the aeration systems.

The Centrifugal Oxygenator Systems provide equal advantages in the design and operation of treatment plant flow equalization systems because of their ability to operate at levels of as low as 3 feet and at any variable levels of up to 100 feet. In the current designs of flow equalization systems, over 50 percent of their holding volumes are not usable due to their use of fixed position multiple orifices mounted on air piping near the bottom of the tanks.

The use of fixed or floating mechanical aeration systems also provide less than 50 percent utilization of the total volume in the equalization tanks due to the fixed position of the impeller or the limited vertical travel coupled with the limitations of their impeller dispersion and flow patterns. It is the claim of this invention that the use of Centrifugal Oxygenator Systems will increase the capacity of existing or future flow equalization tanks by 25 to 100 percent and still maintain high rates of Oxygen transfer.

The Centrifugal Oxygenator Systems can provide high rate aeration with high efficiency, using air, enriched oxygen, or pure oxygen feed to head boxes of inlet structures of treatment plants thus providing odor control and preaeration of the incoming flow prior to grit removal. This aspect of said invention is again based on the ability of the Centrifugal Oxygenator to operate at liquid levels of as low as 3 feet and at any variable level to 100 feet while still providing efficient rates of Oxygen transfer.

Systems for the removal of large size solids from wastewater such as traveling bar-screens, fixed bar-screens, and rotating screening devices have low liquid height sumps that are subject to anaerobic digestion which results in corrosion, odor, and explosion hazards. The ability of the Centrifugal Oxygenator Systems to operate at low and variable liquid levels coupled with high oxygen transferrates provides a means for the elimination of odor, corrosion, and explosion hazards within the large solids removal systems of wastewater treatment plants. This invention provides the means of solving existing and future problems of odor, corrosion, and explosion hazards in systems that are required to remove large solids in wastewater treatment plants.

The removal devices of non-organic small solids in wastewater treatment plants are normally called "Grit Collection Systems". In the grit collection systems, similar problems are found as in the large solids removal systems. This is because organic materials are mixed with the non-organic solids in the sump or collector components of the grit removal systems which contain a fluid mixture of wastewater, non-organic solids, and organic solids. This provides excellent conditions for anaerobic digestion of the organic material in the grit removal system with the resultant problems of odor, corrosion, and explosion hazard. Due to the ability of the Centrifugal Oxygenator Systems to operate at liquid levels of as low as three feet, operate at variable liquid levels, transfer Oxygen efficiently under all conditions, and provide gas flow control that will allow for the operation of standard centrifugal pumps in the collectors or sump without "airbinding". This invention provides a means to solve the problems in existing and future designs of grit collection systems of wastewater treatment plants.

Primary and secondary aeration systems in wastewater treatment plants provide the means of controlled oxidation of the organic material in the incoming wastewater streams. To improve the efficiency of this oxidation reaction "Return Activated Sludge", which is a mixture of organic solids and aerobic bacterial concentrations, is returned to the primary aeration tanks for the purpose of increasing the concentration of the aerobic bacteria in the incoming wastewater stream. By the use of the centrifugal Oxygenator Systems, in place of standard impeller centrifugal pumps, the "Return Activated Sludge" can be provided with high oxygen concentrations prior to entering the aeration tanks, thereby providing much higher efficiencies of dissolved oxygen transfer, reducing the high rate of oxygen demands in the initial portion of the primary and secondary aeration tanks, eliminating the need for return sludge centrifugal pumps, and increasing the overall efficiency of oxidation in the aeration tanks. It is the claim of this invention that the use of the Centrifugal Oxygenator Systems will greatly increase the performance of treatment plants that use any type of an activated sludge process for the treatment of wastewater.

The designs of primary and secondary aeration tanks are currently limited by the means of aeration and with their restrictions imposed by the lack of flexibility in location of the equipment. Other design problems caused by the current means of aeration are in the mixing action produced, inflexibility of the systems to direct the flow of aerated wastewater (except in a single pattern of distribution), and the low oxygen transfer rates through the entire tank due to their operation on the induced flow principle. These are all restrictions in the design of past and future primary and secondary aeration tanks. The ability of the Centrifugal Oxygenator Systems to operate at low liquid levels, variable liquid levels, and to provide for any needed directional discharge of the aerated wastewater mixture opens many completely new design possibilities for more cost efficient construction of new wastewater treatment plants as well as for the conversion of existing plants, at low cost, into highly efficient systems. A group of Centrifugal Oxygenators located in an aeration tank can provide a great increase in aeration tank efficiency by their ability to provide directionalization of the demands of the aerated wastewater that is not in a fixed pattern, as is the case with currently available aeration equipment. It is the claim of this invention that it will provide new efficient design capabilities in the construction and modification of aeration tanks that will result in much lower initial costs and higher efficiencies of operation.

In wastewater treatment plants the current method of small solids removal is by the use of dissolved air floatation/separation systems. These systems disperse compressed air into a pumped recirculation stream through the use of a fixed orifice type diffuser system. To minimize the pluging of the orifices, the size of the orifice must be large enough to pass the solids in the recirculated wastewater stream. The outcome of this requirement results in inefficient gas dispersion. As the air diffusion is accomplished by small size openings in the fixed orifice diffuser, high operating pressures are required. It is the claim of this invention that the Centrifugal Oxygenator will provide a higher efficiency of gas dispersion at lower pressures than current systems; thus providing cost savings in electric power use and higher efficiencies of dissolved and entrained air in the floatation/separation systems of wastewater treatment plants.

The use of aerobic sludge digestion systems in wastewater treatment plants has been very limited due to the lack of a suitable aeration systems that allow for start/stop operation without pluging problems, provide aeration and mixing of the bottom of the digestor tanks, are able to operate at variable liquid heights, and provide efficient oxygen transfer rates needed for the digestion of sludge using the aerobic process. The common method of sludge digestion is the anaerobic process with Methane gas produced as a byproduct. The problem of the Anaerobic Digestion Process is that it also produces Hydrogen Sulfide Gas and complex organic Mercaptans which result in corrosion and odor problems. As the value of the Methane gas produced, in many cases, does not compensate for the problems of the byproducts also produced, the availability of a viable Aerobic Digestion Process provides options in the design and operation of wastewater treatment plants. It is the claim of this invention to provide an aeration system for the Aerobic Digestion of Sludge that can operate on oxygen demand with start/stop operation without fear of pluging, operate at any liquid level as low as three feet, operate at variable levels up to 100 feet, and provide high oxygen transfer efficiency rates; thus making the aerobic digestion process for sludge available as a viable alternate to the anaerobic digestion process.

Due to current restrictions covering the disposal of wastewater effluent into existing water sources, advanced treatment and reuse of effluent are major considerations in the design and operation of wastewater treatment plants. The current foreseeable shortages of fresh water and the need to utilize water for irrigation have provided new incentives for the development of advanced treatment of wastewater effluent for reuse. For the reuse of wastewater effluent, it is necessary for the effluent to have sufficient dissolved oxygen concentrations to eliminate the possibility of any anaerobic digestion of the small traces of organic matter still remaining in the effluent.

It is the claim of this invention that the Centrifugal Oxygenator Systems due to their ability to operate efficiently at low liquid levels, at variable liquid heights, and with sufficient control to allow for their use in effluent pump station wetwells which will provide a means to increase dissolved oxygen levels in effluent reuse systems.

With the reuse of effluent, due to the large variation of flows received by wastewater treatment plants during a 24 hour operating cycle, a need for the storage of effluent is apparent. Storage tanks, of even highly treated wastewater, need the addition of dissolved oxygen in order to maintain an aerobic condition in the bottom of the storage tanks that are subject to precipitation of small cohesive solids. It is the claim of this invention that the Centrifugal Oxygenator Systems can provide the required low level aeration, the directional discharge of the recirculated effluent across the bottom of the storage tanks, and provide efficient oxygen transfer rates at variable liquid level operation required for all storage tanks.

The solids concentration systems of wastewater treatment plants contain low height collector tanks and receiver sumps necessary for dewatering the effluent from the solids concentration devices. These collector tanks and sumps, devoid of dissolved oxygen, are sources of odor and safety concerns for the plant operators and people living near or coming in close contact with the treatment plant. Aeration of these collectors and tanks have not been possible with existing aeration equipment. It is the claim of this invention, due to its ability for low level aeration, variable liquid level operation, and controlability for operation in conjunction with centrifugal pumps, that it provides a solution to these problems.

It is here desired to point out that the form of oxygenator used may be varied in accordance with treating conditions and that we do not desire to be limited to the particular oxygenator shown. Various other types of oxygenators which will agitate and cause the air or oxygen to be absorbed in biodegradable liquid as constructed under the principles shown and described herein and coming under the scope of the claims of the present invention, may be attained without departing from the spirit and scope of the novel concepts thereof.

We claim:

1. A continuous pressurized process for increasing the absorption rate of oxygen into biodegradable waste, comprising providing efficient oxygen diffusion in liquid levels as low as about 3 feet to in excess of about 100 feet by the establishing of a collection and agitation zone for collecting biodegradable waste mixed with an oxidizing gas, drawing the gas and biodegradable waste into the collection and agitation zone along the same axis, establishing a pressure zone, vigorously mixing the gas and waste as drawn into the collection and agitation zone, and then establishing a discharge zone which increases the pressure in the collection zone to increase the rate of gas absorption.

* * * * *